United States Patent Office
3,073,112
Patented Jan. 15, 1963

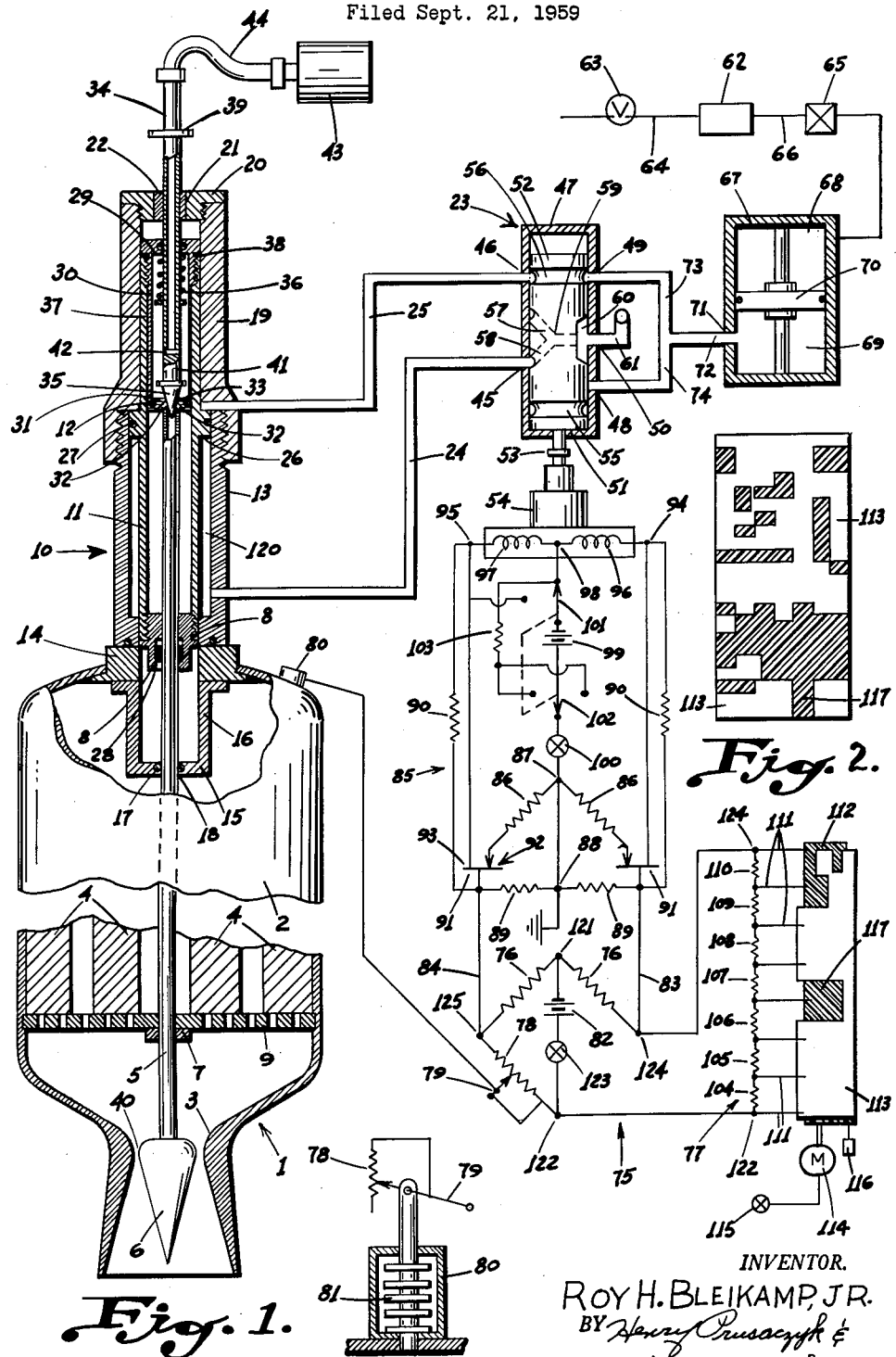

3,073,112
ROCKET MOTOR CONTROL SYSTEM
Roy H. Bleikamp, Jr., Edwardsville, Ill., assignor to Olin Mathieson Chemical Corporation, East Alton, Ill., a corporation of Virginia
Filed Sept. 21, 1959, Ser. No. 841,925
14 Claims. (Cl. 60—35.6)

This invention relates to rocket-propelled devices and more particularly to a means for controlling the thrust level of rocket motors.

A rocket motor, broadly, consists essentially of a cylindrical chamber provided with a venturi type discharge nozzle. A propellant composition is contained within the rocket chamber, and upon ignition generates hot combustion gases which are ejected at high pressures and velocities through the exhaust nozzle located at the rear of the rocket. In such rockets the burning rate of the fuel is proportional to the pressure in the combustion chamber; and in rockets of fixed design, the rate of burning progressively increases with increasing combustion chamber pressures. In turn, the thrust of the rocket is proportional to the combustion chamber pressures, and accordingly, increases with the increases burning rate of the propellant. However, it is often important that the thrust level be controlled to provide variations for specific applications. For example in acceleration studies, in landlocked operations of sleds, a controlled thrust variation is desired to provide varied acceleration-times studies during the operation of the sled. The work with sleds is principally for the study of the effects of eccelleration and de-acceleration in regard to human endurance. Controlled acceleration levels are also important because quite often the test specimens, humans, are placed on the sled in different positions for a particular study.

Control for variations of thrust are also necessary if uniform acceleration is required with a changing load due to the consumption of the solid propellant. For example, if constant acceleration is desired, the thrust level must decrease as the weight becomes lighter. Another reason for a variable thrust is a variable drag effect of the rocket vehicle vs. speed. This is particularly true during the transition from subsonic to supersonic velocity.

Accordingly, it is an object of this invention to provide an effective means for controlling a thrust developed by a solid propellant rocket engine.

Another object of this invention is to provide rocket propelled devices with means to automatically control the thrust level of the rocket at a predetermined schedule.

Still another object of this invention is to effectively control the thrust of a rocket by a novel means for varying the effective nozzle exit area at a predetermined schedule.

Another object of this invention is to vary and control the thrust level of a rocket engine by means of an electro-mechanical control system.

A further object of this invention is to effectively vary and control the thrust level of a rocket engine by monitoring the effect of a prescheduled program change in the nozzle exit area on combustion chamber pressures.

Broadly speaking, the above objects and other objects of this invention are accomplished by providing an electromechanical means for axially positioning a restriction in the throat of a rocket exhaust nozzle to vary its effective exist area. This is accomplished by providing a variable thrust rocket motor with means for controlling the internal pressure or rate of burning of a contained solid propellant charge at a predetermined "thrust-time" schedule by positioning a restricting or constricting member in the rocket nozzle, or orifice, by use of a coordinated mechanism comprising a conventional servo motor hydraulic system controlled by a timed rotary switching device and a pressure sensing variable resistance activated by the pressure within the rocket motor.

More specifically, the system includes a timed switching device which changes the resistance in one leg of a Wheatstone bridge at a predetermined schedule. A device for sensing the pressure in the combustion chamber, of the rocket motor, controls the resistance in an opposed leg of the same bridge. A programed unbalance from the timed switching device in one leg of the bridge causes current to flow to an electrical amplifying circuit which causes a servo motor to move in the direction of the programed unbalance in the bridge until balance in the bridge is reestablished by the pressure sensing device, corresponding to a fixed relationship of a set of variables describing the function of the rocket.

In this relationship, the thrust (F) of a rocket, with propellants is given by the equation:

(1) $$F = C_f P_c A_t$$

where $C_4$ designates the thrust coefficient, $P_c$ designates the combustion chamber pressure (p.s.i.a.) and $A_t$ represents the nozzle throat area.

The burning rate (R) varies with pressure for practically all solid propellant materials as shown by the equation:

(2) $$R = CP_c^n$$

where $n$ is dependent upon the propellant formulation. The higher the $n$ value the more sensitive the burn rate is to pressure changes. If the propellant burning rate were independent of pressure, a reduction in nozzle area would result in a proportional increase in pressure so that thrust would remain constant. However, since the burning rate increases with pressure, a reduction in the nozzle area is more than offset by the pressure increase and a thrust increase results. This thrust control system functions best with propellants with high $n$ values.

In accordance with the invention, a Wheatstone bridge circuit is used with appropriate conductors connected across a diagonal for detection of unbalance. When equilibrium or constant thrust is maintained, the bridge will be in balance with no current flowing through the conductors. A suitable programing device is provided to create a predetermined amount of unbalance in one leg of the bridge causing current to flow in the conductors, at the diagonal, to an appropriate amplifying circuit which is connected to a servo mechanism to alter the position of the constriction in the exhaust nozzle. A pressure sensing device for the pressures in the combustion chamber is provided to proportionally vary the resistance in an opposed leg of the bridge. Thus, the program unbalance in the bridge alters the position of the constriction, in the exhaust nozzle, until the changing pressures, in the combustion chamber, reestablish the balance in the bridge, thereby arresting the movement of the constriction in the exhaust nozzle.

In addition, the invention provides for the positioning of the constriction, and thereby the nozzle throat area, to maintain a desired thrust level of the rocket despite variations in the combustion chamber pressures. For example, if the combustion chamber pressure should rise, the sensing device alters the resistance in a leg of the bridge to cause current to flow to the amplifying circuit and the servo mechanism to position the constriction in the exhaust nozzle at a point to maintain the thrust at the level required.

In like manner, when the combustion chamber pressures are decreased, the resultant unbalance, through the sensing device in the bridge, causes a movement of the constriction in the opposite direction to also maintain the thrust level required.

Other objects and advantages will become more apparent from the following description and drawings in which:

FIGURE 1 is a schematic partial sectional view of a rocket motor and control mechanism illustrating an embodiment of this invention;

FIGURE 2 is a plan view of an embodiment of a programing means that may be employed in this invention; and FIGURE 3 is a partial sectional view of a pressure sensing means that may be employed in this invention.

Referring to the drawings, a rocket motor assembly 1 incorporating an embodiment of the invention comprises a combustion chamber 2 provided with venturi shaped exhaust nozzle 3, and contains a supply of fuel 4 which may be of conventional types and generally of the pressure depended type. The gases developed by the burning propellant are discharged through the exhaust nozzle 3. Preferably, the fuel for the rocket is a solid propellant which exhibits a burning rate that varies proportionately with the combustion chamber pressure of which the propellant of following composition is representative.

| | Parts by weight |
|---|---|
| Nitrocellulose | 58.6 |
| Nitroglycerin | 24.2 |
| Dimethylphthalate | 9.6 |
| Dinitrotoluene | 6.6 |
| Ethyl centralite | 1.0 |
| Carbon black | 0.1 |

A rod 5 is longitudinally and reciprocally mounted in the combustion chamber 2 for axially positioning a constricting member, or bob, 6 secured to the end of the rod projecting through the exhaust nozzle 3. The positioning of the constrictor varies the effective throat or nozzle exit area of the exhaust nozzle. The rod 5 is mounted by means of two bearings 7 and 15 in the combustion chamber and is attached at its forward end to piston 12. The rear bearing 7 is integral with a perforated screen 9, at the rear of the rocket, and holds the rod centered on the rocket motor axis, while the rear bearing 15 serves the same purpose plus effecting a seal between the gas combustion chamber and the piston assembly 10 attached to the exterior of the rocket.

The piston assembly 10 is actually two pistons 11 and 12, one within the other and contained within a housing 13 attached to the rocket by means of a cap 14 and travel limiting means 15. Cap 14 and limiting means 15 both contain a passage 16 for axial movement of piston 11 therein, whereas in addition, limiting means 15, which also serves as a bearing for rod 5, is provided at its closed end with an aperture 17 through which rod 5 passes in sealing engagement by means of a sealing means, such as an O-ring 18. Piston 11 is further enclosed within a forward housing 19 threadedly engaged to housing 13 and is closed by a threadedly engaged cap 20. A packing 22, such as asbestos, seals the rod 5 within aperture 21. The outside piston 11 rides within housing 13 which is fed hydraulically by the servo mechanism 23 to which it is connected by conduits 24 and 25. Piston 11 divides the chamber 120 and housing 13 into two sections by means of a ring 26 attached to its center in sealing relationship to housing 13 by sealing means 27, such as an O-ring. The manner in which piston 11 divides the housing 13 is such that when fluid is fed to one side of the ring, piston 11 is forced to move in the other direction, and vice versa.

The rear end of piston 11 is closed by a threadedly attached bearing, and end wall 8 in which rod 5 movably passes in sealing engagement by means of pressure seals 28. The other end of piston 11 is sealed by threaded engagement to a forward end wall 29 which has an inwardly projecting cylindrical portion 30 whose rear end serves as a stop for arresting the forward movement of piston 12. Piston 12 and forward end wall 29 are adapted to slidably ride in the chamber of forward housing 19.

The inner piston 12 consists of a cylindrical portion 31 connected to the rod 5 which is attached to the restrictor 6 in the throat of the exhaust nozzle 3. The cylindrical portion or ring 31 of piston 12 is located near the center of the chamber formed by the outside piston 11 and contains a pair of apertures 32 that pass from the rear face of the ring into a conical depression 33 in the forward face of the ring. Hydraulic fluid under slight pressure is contained on both sides of ring 31 to hold it in position within the chamber of piston 11. Apertures 32, in ring 31, are plugged by a follower rod 34 which has its near portion 35 tapered to the shape of the conical depression 33 in which it is held tightly by means of a spring 36 attached to the follower rod 34 and seating on the forward end wall 29 within chamber 37. The follower rod 34 passes through two pressure sealed bearings 21 and 38, respectively, such as asbestos packing or O-rings, one in the forward end wall 29 and one in the outer chamber wall 20.

At a suitable distance from the end of wall 20, a stop 39 is permanently attached to the follower rod 34 so that if the outside piston 11 travels too far forward, the stop 39 abuts cap 20 to prevent the follower rod 34 from going any further thus pulling its rear end 35 out of the conical depression 33 in ring 31 of inside piston 12. This allows the hydraulic fluid to pass easily from one side of ring 31 to the other.

Such action also occurs when the pressure of the exhausting gases in chamber 2 becomes excessive and causes the restrictor 6 and piston 12 to be forced forward. This acts as a safety valve, in that this action would occur when and if the propellant 4 should shatter and/or cause extreme pressures in the combustion chamber 2. This action is called dumping in that the pressure in the combustion chamber is relieved to a certain extent by means of increasing the nozzle exit area 40. If this is done rapidly enough, damage can be prevented.

The follower rod 34 is hollow from portion 41 forward and is provided at portion 41 with apertures 42 communicating with the chamber 37 defined by cylindrical portion 30 on forward end wall 29 and ring 31. On the end of the follower rod 34 outside of the piston assembly 10 there is attached a low pressure accumulator 43 by means of conduit 44 which acts to keep the inside chamber 37 at a constant pressure.

The hydraulic fluid required to drive outside piston 11 in the piston assembly 10 is provided through conduits 24 and 25 connected to ports 45 and 46, respectively, in a servo valve housing 47, which in addition, contains ports 48, 49, 50 and an axial port 51. The servo valve housing contains a servo valve piston 52 connected through port 51 by an appropriate linkage 53 to a conventional servo motor 54 adapted to reversely drive servo valve piston 52 back and forth in housing 47. Servo valve piston 52 is provided with peripheral grooves 55 and 56 which are adapted to provide communicating passages with one pair of ports 45 and 48, and 46 and 49, respectively, alternately at each extreme limit of travel of the piston within housing 47. The piston 52 is also provided with a dump circuit which consists of two passageways 57 and 58 merging into a common passage 59 connected to a cutout portion 60, of piston 52, which is in continuous communication with a dump port 61 connected in port 50. The dump circuit is adapted so that it is also in communication with one of the conductors 24 and 25 which is not in alignment with one of the peripheral grooves 55 and 56.

The pressure for the hydraulic fluid is provided by a gas pressure tank 62 loaded with an inert gas, such as nitrogen, through valve 63 in conduit 64 from an external source at a high pressure. The inert gas in tank 62 is fed through a reduction valve 65 in conduit 66 to a pressurizing tank 67. The pressurizing tank 67 is divided into two compartments 68 and 69 by a movable diaphragm such as a sealed piston 70. The inert gas is fed to one of the compartments to move the diaphragm against a hydraulic fluid contained in compartment 69 thereby pressurizing it and forcing it through ports 71 and conduits 72, 73 and 74 into ports 48 and 49 of servo valve housing 47.

The control circuit 75 consists of a Wheatstone bridge provided with equal value, paired resistors 76 in a pair of opposed legs, a programing resistance 77 and a pressure sensing variable resistor 78 in the other pair of opposed legs. The pressure sensing variable resistor may comprise a conventional potentiometer whose wiper arm 79 may be actuated by a pressure responsive bellows 81 adapted to communicate with the combustion chamber of the rocket motor for response to pressures contained therein. Alternatively, resistor 78 may comprise an electrical resistance strain gauge suitably connected to the rocket and connected in the Wheatstone bridge.

One diagonal of the Wheastone bridge is connected at the common terminals between resistors 76 and resistance 77 and 79 to a source of potential 82 and switch 123. The terminals 124 and 125 at the other diagonal bridge are connected to conductors 83 and 84. When the Wheatstone bridge is in balance, there is no output from the bridge, however, when unbalance occurs, either by programing or in response to the combustion pressure, the differential output is fed by conductors 83 and 84 to an amplifying circuit 85 which amplifies the current to a value necessary to operate the servo motor 54 to which it supplies current.

The unbalance of the Wheatstone bridge is fed through conductors 83 and 84 to the base electrode 91 of a pair of biased crystal triode amplifiers 92 whose collectors are joined through paired resistors 86 to a common terminal 87. Conductors 83 and 84 are also grounded through paired resistors 89 at a common terminal 88 electrically which is also connected to common terminal 87.

Conductors 83 and 84 are further connected through a paired resistor 90 to the emitters 93 at common terminals 94 and 95, respectively. A pair of coils 96 and 97, of servo motor 54, having a common terminal 98 are connected at their other ends to common terminals 94 and 95, respectively. Common terminals 87 and 98 are connected across a source of potential 99 and switches 100. Although the circuit described is complete, by provision of switches 101, 102, resistor 103 appropriately connected by a circuit to each other, as illustrated, the servo motor 54 may be driven independently of or while the Wheatstone bridge is in balance, for example during static testing.

The entire circuit is so designed so that when the control circuit 75 is unbalanced the current may pass through either of the transistors, biased triode amplifiers 92, in the amplifier circuit 85, depending upon the direction of unbalance. This causes current to flow in one of the motor coils 96 and 97 in one direction or the other, depending upon the direction of unbalance. Although a specific amplifying circuit utilizing crystal triode amplifiers has been described, it is to be understood that other equivalent circuits and triodes may be employed. For example, crystal triode amplifiers, or transistors, 92 may be substituted by electronic tubes.

The programing device 77 consists of seven resistors 104, 105, 106, 107, 108, 109 and 110, or any lesser or greater number, connected to each other in series to form the leg of control circuit 75. The intersection of common terminal of the resistors and the terminals 122 and 124 of the end resistors 104 and 110 are provided with electrical contact brushes 111 which ride on the surface of a drum 112 which is covered with a printed circuit 113 designed in such a way that when drum 112 is rotated at a specific speed, various combinations of output resistances per unit time are achieved due to the number of desired resistances in the series circuit being shorted out by the brushes 111 at their intersections. The drum 112 may be rotated by a constant speed electric motor 114 energized by switch 115. A micro switch 116 may be provided to serve not only to place the electro-mechanical system into operation, but if desired, also to ignite the propellant 4 contained in the rocket motor. The programing tape may be fabricated of copper plated non-conducting plastic, such as Teflon, on which the desired sequence of programing is provided by etching away the copper to leave a non-conductive surface 117. Although a programing tape has been described, since it provides a simple means of unbalancing a Wheatstone bridge, it is to be understood that other means may be employed. For example, the programing may be accomplished by a magnetic tape, which by an appropriate electrical circuit, may be made to function as a variable resistance in one leg of the Wheatstone bridge.

In operation, the operator may throw the switch 115 that starts the timing motor 114 to rotate the programing drum 112. After a suitable warm up period, a projection on the rotating drum 112 may contact the micro switch 116 to simultaneously or sequentially fire the rocket motor and energize the electro-mechanical control system of the invention. After ignition, the pressure of the combustion of the rocket through resistance 78 establishes a balance in control circuit 75, and results in no current flow to the amplifying circuit 85 for operation of the mechanical portion of the control system which moves constriction 6. As the drum rotates further in time, the etched surface of drum 112 contacting the shorting brushes 111, of series resistance 77 in one leg of the bridge circuit 75, causes the resistance 77 in this leg to change in a certain direction which unbalances the control circuit 75. This unbalanced condition causes current to flow in conductors 83 and 84 to feed the push-pull transistor amplifier 85. The unbalanced current is amplified and passes through one coil of servo motor 54 causing it to move in one direction. The shaft 53 of this motor positions the piston 52, of servo valve 23, to position one of its two fluid circuits, with this selection of fluid circuits depending on the direction the servo valve 52 is caused to move by the servo motor 54.

As the servo valve 23 opens one circuit, the fluid under pressure enters one side of the piston chamber 120 formed between housing 13 and the outer piston 11 forcing piston 11 in the direction of least mechanical resistance. This causes rod 5 in attached throat constrictor 6 to move in the same direction causing a change in the combustion chamber pressure. The fluid on the other side of ring 26 on piston 11 is allowed to escape through servo valve 23 out of conduit 61.

The changing combustion chamber pressure is impressed upon the sensing means, or transducer, 80 causing a change in resistance 78 in such a direction that the control circuit 75 tends to become balanced. When the control circuit 75 is balanced, movement of the constrictor, or bob, 6 is arrested until the next increment of time when the programing resistor 77 signals another desired change in thrust level.

As pointed out above, the programing device may signal dumping of the rocket motor. When the dumping signal is impressed on control circuit 75, the outer piston 11 is caused to move to an extreme rear position causing stop 39 on follower rod 34 to be arrested against the chamber end wall 20 to withdraw conical portion 35 out of conical depression 33 in the inner piston 12. When this occurs, the rocket chamber pressure forces the bob to move to its extreme point of travel to the rear against the low pressure hydraulic fluid in the piston assembly, contained within the outer piston 11, which flows through apertures 32 into chamber 37.

Also, in operation at a given programed thrust level, when the pressure in the combustion chamber rises to upset the relationship of equation, the increased pressure is impressed on the variable resistance 78 on control circuit 75 to activate the electro-mechanical control system of this invention to position the bob or constriction 6 in nozzle 3 until equilibrium is again obtained. Thus, for a given thrust level, the electro-mechanical control system of this invention also performs an automatic self-regulating function by sensing the variations in the combustion chamber pressure.

In accordance with the invention, as can be seen, the electro-mechanical control system provides an effective means for adjusting the nozzle exit area to provide predetermined level of thrust.

Although the invention has been described with reference to specific embodiments, materials and details, various modifications and changes will be apparent to one skilled in the art and are contemplated to be embraced within the invention.

What is claimed is:

1. In a rocket motor, a combustion chamber having a nozzle and a nozzle orifice having an adjustable nozzle throat area, a first means providing a predetermined series of signals, a second means responsive to said signals and operatively connected with said nozzle to vary the nozzle exit area, said second means comprising a Wheatstone bridge, a source of energy connected across one diagonal of said bridge, a resistor in an arm common to said diagonal adapted to be varied in a predetermined series of magnitudes, and a pair of conductors connected across the terminals of the other diagonal of said bridge to conduct the magnitude of unbalance as a signal to said second means, and a third means for providing a signal to said second means which is a measure of the pressure in said combustion chamber to regulate the degree of change in said nozzle throat area.

2. The rocket motor of claim 1 wherein said first means comprises in addition a programing device consisting of a traveling tape provided with an electrical printed circuit, a plurality of resistors connected in series forming said first resistor in said bridge, a plurality of electrical contact brushes at the terminals of each of said plurality of resistors adapted to contact said tape, said printed circuit being adapted to short circuit said resistors in a predetermined pattern.

3. The rocket motor of claim 2 wherein said second means comprises a pair of biased crystal triode amplifiers, each having a base electrode, an emitter and a collector, the base electrode of each triode being connected to one of said conductors at a first common terminal, respective first circuit means coupling an emitter of said triodes about a second common terminal, a source of potential connected to said second common terminal, respective second circuit means grounding said first and second common terminals, respective third circuit means connected to said collector and said first common terminal at a third common terminal and said source of potential, and a third means for deriving an output from said common terminal.

4. In a rocket motor, a combustion chamber having a nozzle and a nozzle orifice having a fixed nozzle throat area and an adjustable nozzle exit area, a first mechanically operated means for automatically providing a predetermined series of signals to vary said nozzle exit area, a second means for providing a series of signals which is a measure of the pressure in said combustion chamber to regulate the change in said nozzle exit area, and a third means responsive to both said signals and operatively connected with said nozzle for varying the nozzle exit area to a predetermined relation between the ratio of the nozzle exit area and the nozzle throat area and the ratio of the combustion chamber pressure and pressure at the nozzle exit.

5. In a rocket motor, a combustion chamber having a nozzle and a nozzle orifice having a fixed nozzle throat area and an adjustable nozzle exit area, a first means correlating the ratio of the nozzle exit area and the nozzle throat area to a ratio of the combustion chamber pressure and the pressure at the nozzle exit to a predetermined relation between said ratios and providing a first signal of said relation, a second means providing a second signal in a predetermined series to alter the nozzle exit area variable in said predetermined relation to said first means, said first means providing a signal which is a measure of a predetermined change in the pressure exit area variable, a third means providing a third signal to said first means which is a measure of the pressure in said combustion chamber, a fourth means responsive to said second signal and operatively connected with said nozzle to vary the nozzle exit area until said predetermined relation in said first means is re-established by said third means.

6. The rocket motor of claim 5 wherein said first means comprises a Wheatstone bridge, a source of energy connected across one diagonal of said bridge, a resistor in the arm common to said diagonal adapted to be varied in a predetermined series of different magnitudes, the other resistor of said arm adapted to be varied as a measure of the pressure in said combustion chamber, and a pair of conductors connected to the terminals of the other diagonal of said bridge to conduct the magnitude of unbalance as a signal to said second means.

7. The rocket motor of claim 6 wherein the third means comprises a measuring means responsive to the pressure in said combustion chamber adapted to vary said other resistor of said arm.

8. The rocket motor of claim 7 wherein said first means comprises in addition a programing device consisting of a traveling tape provided with an electrical printed circuit, a plurality of resistors connected in series forming said first resistor in said bridge, a plurality of electrical contact brushes at the terminals of each of said plurality resistors adapted to contact said tape, said printed circuit being adapted to short circuit said resistors in a predetermined pattern.

9. The rocket motor of claim 8 wherein said second means comprises a pair of biased crystal triode amplifiers, each having a base electrode, an emitter and a collector, the base electrode of each triode being connected to one of said conductors at a first common terminal, respective first circuit means coupling the emitter of said triodes about a second common terminal, a source of potential connected to said second common terminal, respective second circuit means grounding said first and second common terminals, respective third circuit means connected to said collector and said first common terminal at a third common terminal and said source of potential, and a fifth means for deriving an output from said third common terminal.

10. In a rocket motor, a combustion chamber and a nozzle orifice having a fixed nozzle throat area and an adjustable nozzle exit area, a first means correlating the ratio of the nozzle exit area and the nozzle throat area to a ratio of the combustion chamber pressure and the pressure at the nozzle exit to a predetermined relation between said ratios and providing a first signal of said relation, a second means providing a second signal to said first means in a predetermined series of varied magnitudes to alter the nozzle exit area variable in said predetermined relation, a third means providing a third signal to said first means which is a measure of the pressure in said combustion chamber, a fourth means responsive to said first signal to provide energy for varying said nozzle exit area, and driving means responsive to said energy of said fourth means to vary the nozzle exit area until said predetermined relation in said first means is re-established by said third means.

11. The rocket motor of claim 10 wherein said first means comprises a Wheatstone bridge, a source of energy connected across one diagonal of said bridge, a resistor in the arm common to said diagonal adapted to be varied in a predetermined series of different magnitudes, the other resistor of said arm adapted to be varied as a measure of the pressure in said combustion chamber, and a pair of conductors connected to the terminals of the other diagonal of said bridge to conduct the magnitude of unbalance as a signal to said fourth means.

12. The rocket motor of claim 11 wherein the third means comprises a measuring means responsive to the pressure in said combustion chamber adapted to vary said other resistor of said arm.

13. The rocket motor of claim 12 wherein said first means comprises in addition a programing device consisting of a traveling tape provided with an electrical printed circuit, a plurality of resistors connected in series forming said first resistor in said bridge, a plurality of electrical contact brushes at the terminals of each of said plurality resistors adapted to contact said tape, said printed circuit being adapted to short circuit said resistors in a predetermined pattern.

14. The rocket motor of claim 13 wherein said second means comprises a pair of biased crystal triode amplifiers, each having a base electrode, and emitter and a collector, the base electrode of each triode being connected to one of said conductors at a first common terminal, respective first circuit means coupling the emitter of said triodes about a second common terminal, a source of potential connected to said second common terminal, respective second circuit means grounding said first and second common terminals, respective third circuit means connected to said collector and said first common terminal at a third common terminal and said source of potential, and a fifth means for deriving an output from said third common terminal.

References Cited in the file of this patent

UNITED STATES PATENTS

| | | |
|---|---|---|
| 2,780,914 | Ring | Feb. 12, 1957 |
| 2,805,544 | Wells | Sept. 10, 1957 |
| 2,857,119 | Morguloff | Oct. 21, 1958 |
| 2,949,009 | D'Ooge | Aug. 16, 1960 |
| 2,957,307 | Brandenburger et al. | Oct. 25, 1960 |
| 2,968,919 | Hughes | Jan. 24, 1961 |
| 2,979,891 | Widell | Apr. 18, 1961 |